June 12, 1928.
G. KLUMPP
1,673,333
ELECTRIC COOKING, BAKING, AND FRYING APPARATUS
Filed March 21, 1927    2 Sheets-Sheet 1
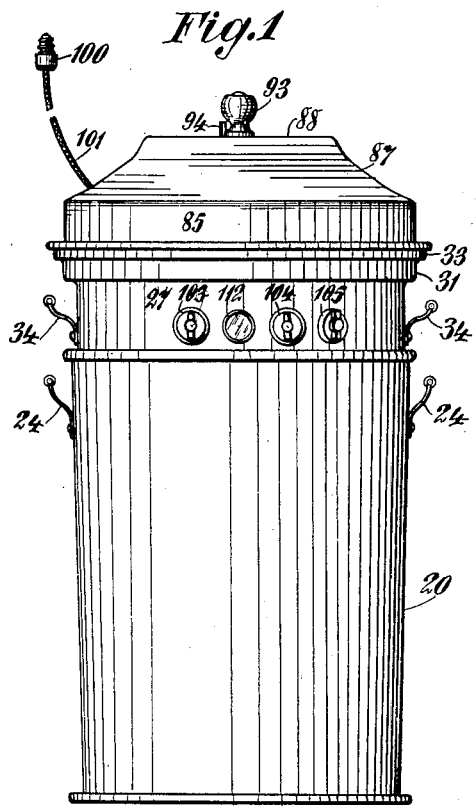
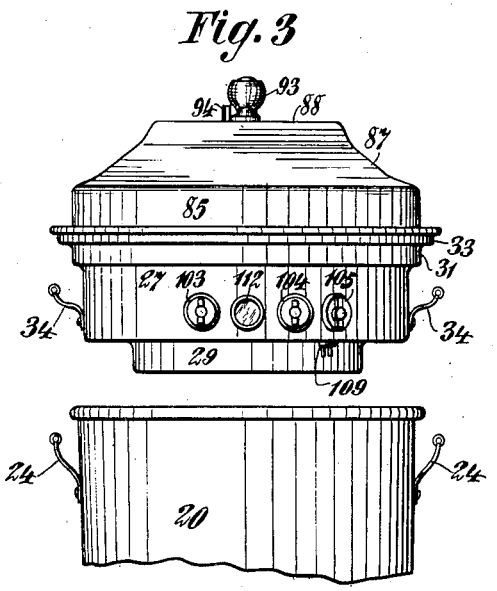
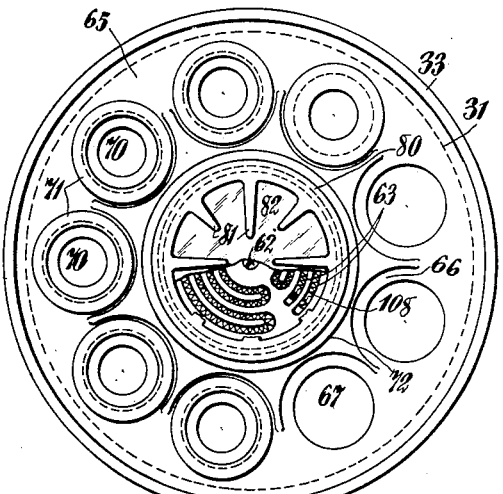
INVENTOR:
Gottlob Klumpp,
BY his ATTORNEY

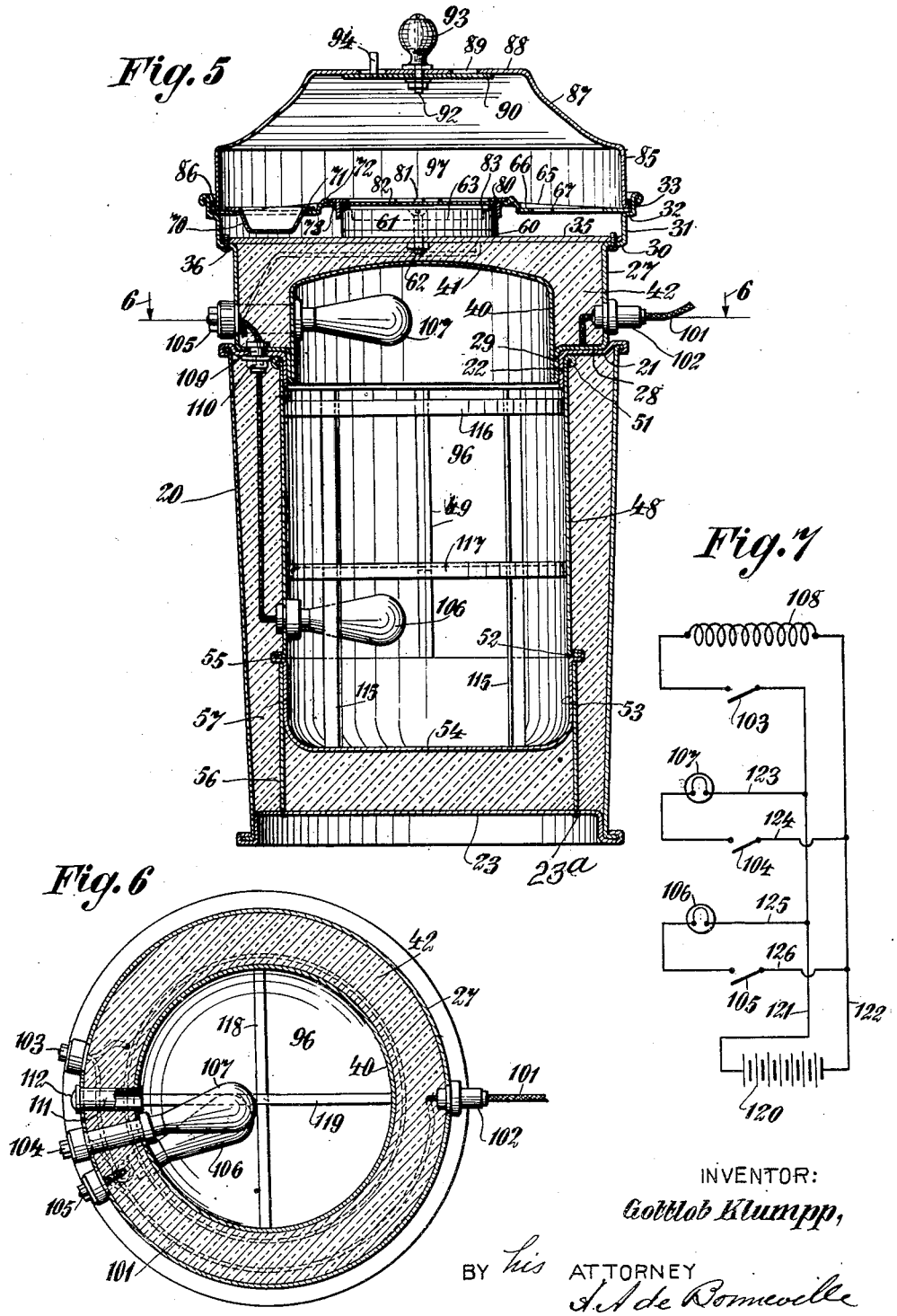

Patented June 12, 1928.

1,673,333

UNITED STATES PATENT OFFICE.

GOTTLOB KLUMPP, OF NEW YORK, N. Y.

ELECTRIC COOKING, BAKING, AND FRYING APPARATUS.

Application filed March 21, 1927. Serial No. 177,128.

This invention relates to an electric cooking, baking and frying apparatus.

The object of the invention is the production of means, by which various foods, or other material may be cooked, baked or fried by heat imparted thereto by electric light bulbs and to a resistance coil. The second object of the invention is the production of apparatus, having detachable parts which can be easily separated from each other, for the purpose of cleaning the same, and their easy inspection and repair. The third object of the invention is the production of an electric apparatus for cooking, baking and frying, wherein the source of electric current can be imparted thereto, by means of an electric socket connected to a source of electric current. The fourth object of the invention is the production of an electric apparatus used for cooking, baking and frying in which means are provided for preventing an element thereof becoming jammed by reason of expansion resulting from the heat imparted thereto. The fifth object of the invention is the production of an apparatus of the nature to be fully described, in which the parts thereof are of simple construction to be enabled to easily replace them.

In the accompanying drawings Fig. 1 represents an elevation of an exemplification of the improved electric cooking, baking and frying apparatus; Fig. 2 shows a top plan view of Fig. 1; Fig. 3 shows a fragmentary elevation of the electric cooking, baking and frying apparatus with a pair of its elements spaced from each other; Fig. 4 shows an enlarged plan view of the apparatus with its lid removed; Fig. 5 represents an enlarged section of Fig. 2 on the line 5, 5; Fig. 6 indicates a section of Fig. 5 on the line 6, 6, and Fig. 7 shows a wiring diagram for the apparatus.

The cooking, baking and frying apparatus is indicated to comprise the main tapered cylindrical barrel 20, which has connected to its top edge the annular flange having the horizontal portion 21, and the sleeve portion 22. At the lower end of the barrel 20 is connected the bottom 23, having the circular depression or crease 23ª semi-circular in cross section.

A detachable head is indicated with the vertical cylindrical wall 27, that has formed therewith at its lower end the annular horizontal flange 28, and from the latter extends the sleeve 29. From the upper end of the cylindrical wall 27 extends the horizontal annular shelf 30, and the latter joins with the vertical supplemental cylindrical portion 31. The latter has formed therewith the horizontal shelf 32 with the inclosing vertical flange 33. A pair of handles 34 extend from the wall 27, by means of which the detachable head can be lifted from the barrel 20. A top plate 35 bears on the horizontal shelf 30, and is fastened in place by means of the screws 36. An inner cylindrical hood 40 having the crowned head 41 is secured to the sleeve 29. The space between the cylindrical hood 40 and the head having the cylindrical wall 27 is preferably filled with mineral wool 42, or other heat insulating material. Within the barrel 20 is located the inner cylindrical barrel 48 having the longitudinal seam 49, and has formed at its top end the bead 51, and at its lower end the flange 52. A cup shaped bottom portion having the cylindrical wall 53 and bottom 54 is provided for the barrel 50. A return flange 55 is formed at the upper end of the wall 53, which clamps the flange 52 of the barrel 50. A sleeve 56 bears on the bottom 23, and the bead 55 of the wall 53 is supported on the top edge of the sleeve 56. Mineral wool 57 is packed in the space between the barrel 48, sleeve 56 and the barrel 20.

A disc 60 of asbestos is located upon the top plate 35 and upon the latter is located the disc 61 of fire brick or other heat insulating or refractory material. A bolt 62 clamps the discs 60 and 61 to the plate 35. Pairs of grooves 63 extend from the upper face of the disc 61.

A tapering annular plate holder 65 is supported on the shelf portion 32. The said plate holder 65 has formed therewith a plurality of depressed portions 66, the upper faces of which are horizontal. Openings 67 are formed in the said depressed portions, for the cups 70 having the annular horizontal flanges 71. An annular head 72 is formed with said plate holder 65 and terminates in the circular central opening 73. A T shaped ring 80, preferably of metal has extending therefrom a plurality of prongs 81 which together constitute a grate. A disc 82 of mica bears up against the upper flange of the ring 80 and is held in place by a plurality of brackets 83, which latter are held in place by bolts or screws not shown.

A lid is indicated with the cylindrical shell 85 having the bead 86 on its lower edge which is adapted to be seated on the plate 65. The shell 85 joins with the tapered portion 87, and the latter has formed therewith the top plate or head 88. A plurality of damper openings 89 are formed in the plate 88. A damper plate 90, having a plurality of openings 91, is rotatably connected to the head 88, by means of the bolt 92 having the knob 93. A pin 94 extends from the damper plate 90, by means of which said damper plate is located in its closed or open position.

The barrel 48, with its cup shaped bottom portion and the hood 40 form the cooking chamber 96 and the plate holder 65 and the lid having the head 88, form the cooking, baking and frying chamber 97.

An electric socket 100 has extending therefrom the cable 101 containing wires which extend through the fitting 102 connected to the wall 27. Three electric switches indicated at 103, 104 and 105 are connected to the wall 27. An electric light bulb 106 is connected to the barrel 48 and extends into the chamber 96. An electric light bulb 107 is connected to and extends into the hood 40 and an electric resistance coil 108 is located in the grooves 63. The said coil 101 is in electric circuit with said electric light bulbs and electric resistance coil 108.

In the annular flange 28 of the detachable head is secured the male member 109 of a detachable terminal, which coacts with its female member 110 connected to the flange 21. By this means the cable extending from the switch 105, is connected to the cable extending from the electric light bulb 106.

A tube 111 with the sight glass 112, extends through the walls 27 and the wall of the hood 40.

Within the chamber 96 is located a detachable crate comprising the uprights 115, which are connected by the bands 116 and 117. Bars 118 and 119 have their ends connected to the band 117.

Referring to Fig. 7 the source of electric current is indicated at 120, from which extends the coil 101, that comprises the wires 121 and 122, which extend to the resistance coil 108. The switch 103 is in circuit with the wire 121. A pair of wires 123 and 124 extend from the wires 121 and 122. The lamp 107 is connected to the wire 123 and the switch 104 is connected to the wire 124. A pair of wires 125 and 126 extend from the wires 121 and 122. The electric light bulb 106 is connected to the wire 125 and the switch 105 is connected to the wire 126.

To use the apparatus and if the chamber 96 is to be used, the object to be cooked is preferably placed in a pan or other utensil and the latter is located upon the bars 118, 119. The detachable head having the wall 27 is placed in position to close the said chamber 96, and the electric light bulbs 106 and 107 are energized until the object to be treated has been cooked. If the chamber 97 is to be used, the cups 70 are filled with the material to be cooked, or a cooking utensil with the material to be treated is placed upon the grate having the prongs 81, and the resistance coil 108 is energized by means of the switch 103.

The disc 82 of mica functions to retain sufficient heat between the plate 35 and the plate holder 65, so that the material in the cups 70 will be sufficiently heated. The tapered shape of the plate holder 65, allows it to expand upwardly when heated, and thereby prevents its circumferential edge being jammed against the enclosing vertical flange 33.

Various modifications may be made in the invention and the present exemplification is to be taken as illustrative and not limitative thereof.

Having described my invention what I desire to secure by Letters Patent and claim is:

1. In an apparatus of the character described the combination of a barrel having a chamber formed therein, a head detachably supported at the upper end of the barrel, electric light bulbs extending into said chamber to impart heat thereto, a top plate secured to the head and spaced below its top edge, a plate holder detachably supported in said head and spaced from said top plate, a grate detachably supported on said plate holder, an electric resistance coil supported below said grate, and means to energize said electric light bulbs and said electric resistance coil.

2. In an apparatus of the character described the combination of a barrel, an inner cylindrical barrel supported in and spaced from said barrel, heat insulating material located in the space between the barrels, an annular flange extending over the top edges of the barrels, a head comprising a cylindrical wall and an annular flange at its bottom end, with the latter detachably supported on the annular flange extending over the top edges of said barrels, said inner cylindrical barrel having a chamber formed therein, electric light bulbs extending into said chamber and means to energize said electric light bulbs to impart heat to said chamber.

3. In an apparatus of the character described the combination of a barrel having a chamber formed therein, a head detachably supported at the upper end of the barrel, a hood connected to the head and within the same, the said hood connecting with said chamber, a top plate secured to the head and spaced below its top edge, a disc of refractory material having grooves in its top face supported over said top plate, a plate holder detachably supported in said head and spaced from said top plate, said plate holder having openings, cups extending into said openings and detachably supported on the plate holder, a grate detachably supported over an opening in said plate holder, a disc of mica supported below said grate, an electric resistance coil supported in the grooves of said disc of refractory material, electric light bulbs extending into said chamber and means to energize said electric light bulbs and said coil.

4. In an apparatus of the character described the combination of a barrel, a bottom for said barrel, an inner cylindrical barrel located in said barrel and spaced therefrom, a sleeve supported on the bottom of the barrel and in turn supporting the inner cylindrical barrel, a head detachably supported on said barrels, said inner barrel with said head forming a chamber in said apparatus, electric light bulbs extending into said chamber and means to energize said electric light bulbs.

5. In an apparatus of the character described the combination of a barrel, an inner cylindrical barrel located in said barrel and spaced therefrom, an annular flange located upon the top edges of said barrels, said flange having a sleeve portion extending downwardly therefrom and bearing up against the inner face of the inner barrel at the upper end thereof, a detachable head for said barrel, said head comprising a cylindrical wall with an annular flange at its bottom end, a return flange extending downwardly from the latter flange, the cylindrical wall of a hood joining with said return flange, a head formed with the cylindrical wall of the hood, and a top plate for said head, said return flange adapted to securely fit the sleeve portion of the flange for said barrel to secure a tight joint.

6. In an apparatus of the character described the combination of a barrel having a chamber therein, a head detachably supported at the upper end of the barrel, electric light bulbs extending into said chamber to impart heat thereto, a top plate secured to the head and spaced below its top edge, a tapered plate holder detachably supported in said head, and spaced from said top plate, means to heat the air in the space between the tapered plate holder and said top plate.

7. In an apparatus of the character described the combination of a head, a top plate secured to the head, a tapered plate holder detachably supported in said head, a plurality of depressed portions in said plate holder, said depressed portions having openings and means to heat the air in the space between said plate holder and said top plate.

In testimony whereof I affix my signature.

GOTTLOB KLUMPP.